Sept. 3, 1968    O. B. WATERS, JR    3,399,961
METHOD FOR SEPARATING Na₂SO₄ FROM BRINES OR BITTERNS
Filed Jan. 3, 1967
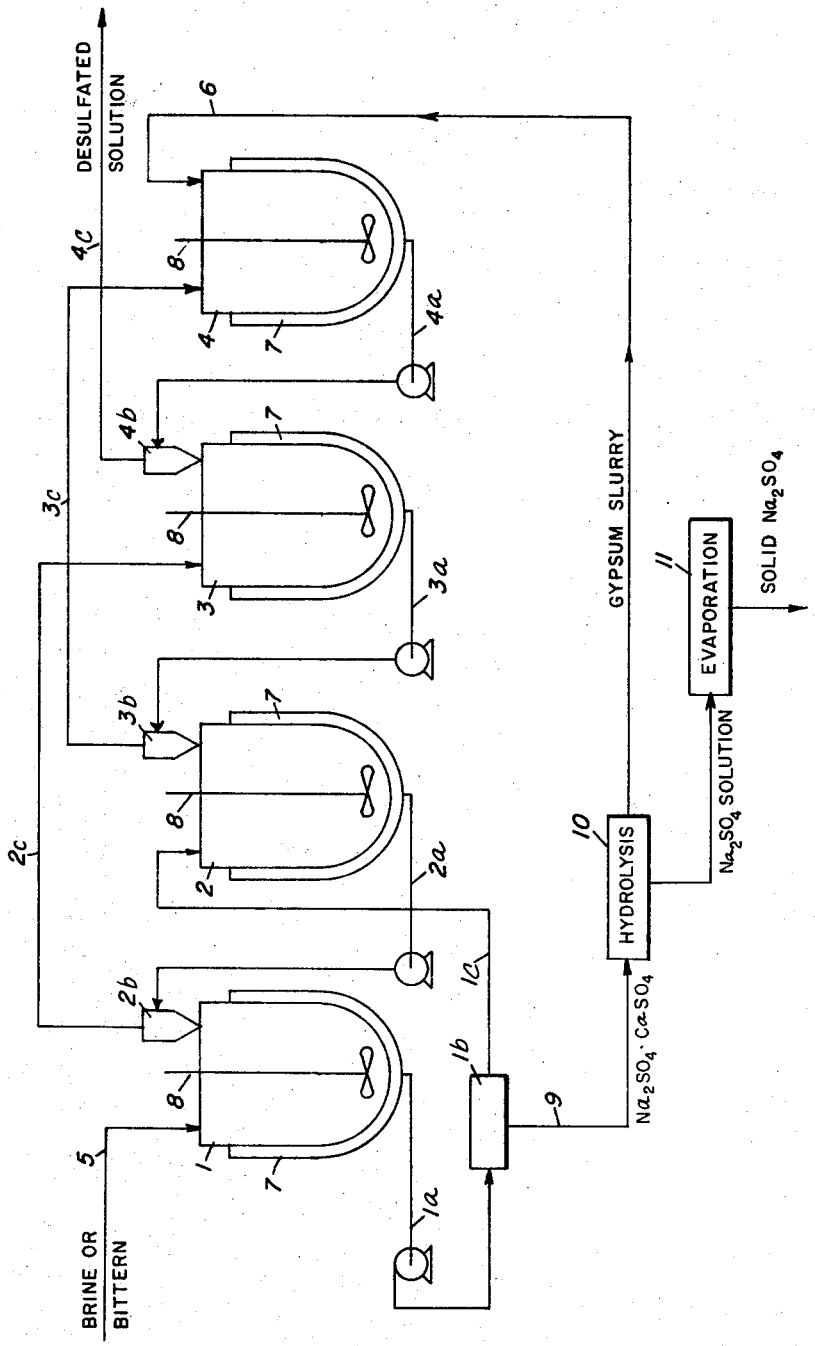
INVENTOR
OSCAR B. WATERS, JR.
ATTORNEY

United States Patent Office 3,399,961
Patented Sept. 3, 1968

3,399,961
METHOD FOR SEPARATING Na₂SO₄ FROM BRINES OR BITTERNS
Oscar B. Waters, Jr., Simpsonville, Md., assignor, by direct and mesne assignments, of one-half each to W. R. Grace & Co., New York, N.Y., a corporation of Connecticut, and to the United States of America as represented by the Secretary of the Interior
Filed Jan. 3, 1967, Ser. No. 607,071
10 Claims. (Cl. 23—121)

ABSTRACT OF THE DISCLOSURE

A brine or bittern heated to 75°–105° C. is passed countercurrently to a gypsum slurry to react the gypsum with sodium and potassium sulfate and form insoluble $Na_2SO_4 \cdot CaSO_4$ and $K_2SO_4 \cdot 5CaSO_4 \cdot H_2O$. Further countercurrent contact between the brine or bittern and the $K_2SO_4 \cdot 5CaSO_4 \cdot H_2O$ reacts the $K_2SO_4 \cdot 5CaSO_4 \cdot H_2O$ with $Na_2SO_4$ to form additional $Na_2SO_4 \cdot CaSO_4$.

---

This invention relates to a process for separating $Na_2SO_4$ from solutions which contain sodium, potassium and sulfate ions such as brines and bitterns.

It is of interest to recover $Na_2SO_4$ from brines and bitterns because (1) this chemical is commercially valuable, and (2) the presence of sulfate salts in brines and bitterns inhibits the recovery of other valuable compounds. Sodium sulfate has heretofore been recovered by fractional crystallization to produce $Na_2SO_4 \cdot 10H_2O$. Since recovery in this manner is incomplete, production of sodium sulfate by this method is not commercially attractive. Furthermore, if sulfate removal is incomplete, the remaining solution is less desirable with regard to subsequent removal treatments for other valuable compounds.

It has now been discovered that the $Na_2SO_4$ can be more completely recovered from such solutions by first contacting the solution with gypsum at a temperature of about 75° C. to about 105° C., and subsequently contacting the resultant solid reaction product with more sodium sulfate-containing solution at the same temperature. Initially, the gypsum ($CaSO_4 \cdot 2H_2O$) reacts with $Na_2SO_4$ and $K_2SO_4$ in the solution to form solid double salts of $Na_2SO_4 \cdot CaSO_4$ and $K_2SO_4 \cdot 5CaSO_4 \cdot H_2O$ (pentasalt), in accordance with the following reaction:

$$Na_2SO_4 + K_2SO_4 + 6CaSO_4 \cdot 2H_2O \rightarrow Na_2SO_4 \cdot CaSO_4 + K_2SO_4 \cdot 5CaSO_4 \cdot H_2O + 11H_2O$$

Additional exposure of the solid $K_2SO_4 \cdot 5CaSO_4 \cdot H_2O$ to solution containing $Na_2SO_4$ (and NaCl, if present) produces a single double salt, $Na_2SO_4 \cdot CaSO_4$, in accordance with the following reaction:

$$K_2SO_4 \cdot 5CaSO_4 \cdot H_2O + 4Na_2SO_4 + 2NaCl \rightarrow 5(Na_2SO_4 \cdot CaSO_4) + 2KCl + H_2O$$

It is therefore an object of the present invention to more completely desulfate brines and bitterns. Another object is to efficiently recover $Na_2SO_4$ from sulfate, sodium, and potassium ion-containing solutions such as brines and bitterns. A further object is to convert $$K_2SO_4 \cdot 5CaSO_4 \cdot H_2O \text{ to } Na_2SO_4 \cdot CaSO_4$$

by contact with sodium sulfate-containing solutions.

Other objects and advantages of the present invention will be obvious from the detailed description of the process appearing in the specification taken in conjunction with the drawing in which an overall procedure for practicing the invention is schematically shown.

Referring to the figure, one manner of carrying out the solids-liquid contact is shown wherein solution is continuously passed serially through a plurality of separate vessels 1, 2, 3 and 4; untreated solution entering the series at vessel 1 by conduit 6. In each of the vessels, solution is reacted with a continuously added gypsum-containing slurry which is received from the vessel immediately downstream (with respect to solution flow); gypsum slurry (e.g., 50% solids) entering the system at vessel 4 through conduit 6, the gypsum being added in approximately a stoichiometric amount with regard to the sulfate content of the solution. In the case of brines and bitterns, the gypsum should be added in amounts ranging from about 0.1 mole to about 1.5 moles per liter of brine or bittern being added to the system.

Each vessel is heated, for example, by a steam jacket to maintain the vessel temperature at about 75° to about 105° C., preferably about 85° C. Intimate contact between the vessel ingredients is brought about by agitators 8, while fluid flow rates are adjusted to allow the ingredients to pass through each reaction vessel in about 3 minutes to about 20 minutes.

In reaction vessel 4 the major portion of the fresh gypsum reacts with the solution to form potassium pentasalt. As the solids slurry moves serially from vessel 4 to vessels 3, 2 and 1, the pentasalt is increasingly converted to the desired sodium-calcium double salt. Simultaneously, as solution flows countercurrently through the system, it initially becomes increasingly depleted of $Na_2SO_4$ and increasingly enriched in potassium ion. In the latter reaction vessels through which it passes, the solution is depleted of still more $Na_2SO_4$ but at a slower rate, and it is simultaneously depleted of excess potassium ion which it received in the initial contacting stages.

Mass transfer between vessels is accomplished by conduits 1a, 2a, 3a and 4a which continuously remove a solids-liquid mixture from vessels 1, 2, 3 and 4, respectively, the mixture being conveyed by these conduits to separators 1b, 2b, 3b and 4b, respectively. Separators 2b, 3b and 4b are of the cyclone type while separator 1b is a centrifuge. From separators 1b, 2b and 3b the liquid is continuously conveyed by conduits 1c, 2c and 3c, respectively, to vessels 2, 3 and 4, respectively. Desulfated solution leaves the series through conduit 4c. A slurry of $Na_2SO_4 \cdot CaSO_4$ substantially free of $K_2SO_4$ leaves separator 1a by conduit 9.

After removal of the double salt of $Na_2SO_4 \cdot CaSO_4$ from the system it can be separated into the individual sulfate salts by conventional hydrolysis treatment, shown as reference numeral 10 in the figure, wherein the sodium sulfate goes into solution and the calcium sulfate forms solid gypsum which can be recycled to the system. Conventional evaporation techniques, shown as reference numeral 11, can then be employed to recover solid $Na_2SO_4$ from solution.

The following example illustrates the effectiveness of the process upon a solution containing potassium, sodium and sulfate ions.

Example

A bittern having the following composition:

|   | G./l. |
|---|---|
| $K_2O$ | 13.5 |
| $Na_2O$ | 82.8 |
| MgO | 60.1 |
| Cl⁻ | 180.9 |
| SO⁻⁻ | 48.3 | was continuously passed through a four stage countercurrent contact system as described above, at a rate of 693 g.p.m. A 50% solids gypsum slurry was added to the system at a rate of 1100 pounds per minute. Each vessel was heated to about 85° C. and the average residence time of the mixture in each vessel was about 7 minutes. Effluent solution leaving the system at a rate of 774 g.p.m. had the following composition:

| | G./l. |
|---|---|
| $K_2O$ | 12.2 |
| $Na_2O$ | 48.6 |
| $MgO$ | 54.0 |
| $Cl^-$ | 163.9 |
| $SO_4^{--}$ | 3.4 |

An effluent slurry (65% solids) of $Na_2SO_4 \cdot CaSO_4$ was withdrawn from the system at a rate of over 1250 pounds per minute. This slurry was then continuously hydrolyzed, and the resulting solution evaporated to a solid product containing 98.5% $Na_2SO_4$ produced at a rate of 394 pounds per minute.

Other conventional contacting systems could be employed, as will be apparent to those skilled in the art, to bring about the reaction between (1) gypsum and sodium and potassium sulfate, and (2) potassium pentasalt and sodium sulfate; although greater contacting times and more contacting stages may be required to obtain the same product purity and degree of recovery as can be achieved by the countercurrent contacting system previously described.

Exemplary brines and bitterns which can be treated by the process of this invention are (1) brines produced by desalination, (2) bitterns from solar salt production, (3) naturally occurring bitterns, and (4) brines produced by solution mining of alkali sulfate ores.

While the particular process herein described is well adapted to carry out the objects of the present invention, it is to be understood that various modifications and changes may be made all coming within the scope of the following claims.

What is claimed is:
1. A process for removing $Na_2SO_4$ from saline solution comprising
    (a) contacting a saline solution containing sulfate, sodium and potassium ions with solid gypsum at a temperature of about 75° C. to about 105° C. to react said gypsum with said sulfate, sodium and potassium ions and form a mixture of solid $Na_2SO_4 \cdot CaSO_4$ and solid $K_2SO_4 \cdot 5CaSO_4 \cdot H_2O$;
    (b) contacting said mixture with additional saline solution containing sulfate and sodium ions at a temperature of about 75° C. to about 105° C. to react said sulfate and sodium ions in said additional solutions with said $K_2SO_4 \cdot 5CaSO_4 \cdot H_2O$ in said mixture to form additional solid $Na_2SO_4 \cdot CaSO_4$; and
    (c) separating from solution said $Na_2SO_4 \cdot CaSO_4$ formed during both of said contacting steps.
2. The process of claim 1 wherein said additional saline solution employed to contact said mixture also contains potassium ions.
3. The process of claim 1 wherein said saline solution and said additional saline solution are both selected from the group consisting of brines and bitterns.
4. The process of claim 2 wherein said contacting steps comprise
    (a) passing said gypsum countercurrently to said saline solution to form said mixture;
    (b) passing said mixture countercurrently to said additional saline solution to cause said additional $Na_2SO_4$ to form.
5. The process of claim 4 wherein said saline solution and said additional saline solution are both selected from the group consisting of brines and bitterns.
6. The process of claim 4 wherein said contacting steps comprise passing saline solution containing sulfate, sodium and potassium ions between adjacent, separate reaction zones countercurrent to the flow through said zones of a gypsum slurry and a slurry of said mixture as it forms.
7. The process of claim 6 wherein passing said saline solution, gypsum slurry and mixture slurry through said zones comprises
    (a) initially passing saline solution containing sulfate, sodium and potassium ions to one of the end reaction zones in said plurality of adjacent reaction zones;
    (b) passing saline solution from said one end reaction zone serially through remaining reaction zones;
    (c) initially passing a gypsum slurry to the end reaction zone opposite said one end;
    (d) passing solid slurry from said opposite end reaction zone serially through remaining reaction zones;
    (e) removing from said one end reaction zone an effluent slurry containing $Na_2SO_4 \cdot CaSO_4$ substantially free of $K_2SO_4$;
    (f) removing effluent solution substantially depleted of sulfate ion from said opposite end reaction zone.
8. The process of claim 7 wherein said saline solution which is initially passed to said one of the end reaction zones is selected from the group consisting of brines and bitterns.
9. The process of claim 7 wherein all the steps are carried out continuously.
10. The process of claim 8 wherein all the steps are carried out continuously.

References Cited

UNITED STATES PATENTS

| 1,343,443 | 6/1920 | Freeth et al. | 23—38 |
| 1,415,204 | 5/1922 | Stevenson | 23—38 |
| 2,743,999 | 5/1956 | Binswanger | 23—38 X |
| 2,804,371 | 8/1957 | Dancy et al. | 23—38 |
| 3,248,181 | 4/1966 | Akimoto | 23—121 X |

OSCAR R. VERTIZ, Primary Examiner.

G. O. PETERS, Assistant Examiner.